United States Patent
Yu et al.

(10) Patent No.: US 10,117,221 B2
(45) Date of Patent: Oct. 30, 2018

(54) METHOD AND CORRESPONDING APPARATUS FOR SENDING AND RECEIVING TRUNKING PAGING IN LTE SYSTEM

(71) Applicant: ZTE CORPORATION, Shenzhen, Guangdong Province (CN)

(72) Inventors: Xi Yu, Shenzhen (CN); Liangbin Li, Shenzhen (CN); Longcheng Liang, Shenzhen (CN); Yunshan Sun, Shenzhen (CN); Zhongshi Xie, Shenzhen (CN)

(73) Assignee: ZTE CORPORATION (CN)

( * ) Notice: Subject to any disclaimer, the term of this patent is extended or adjusted under 35 U.S.C. 154(b) by 109 days.

(21) Appl. No.: 14/439,434

(22) PCT Filed: Aug. 2, 2013

(86) PCT No.: PCT/CN2013/080747
§ 371 (c)(1),
(2) Date: Apr. 29, 2015

(87) PCT Pub. No.: WO2014/067307
PCT Pub. Date: May 8, 2014

(65) Prior Publication Data
US 2015/0296481 A1 Oct. 15, 2015

(30) Foreign Application Priority Data
Oct. 31, 2012 (CN) .......................... 2012 1 0427920

(51) Int. Cl.
*H04W 68/02* (2009.01)
*H04W 72/04* (2009.01)
(Continued)

(52) U.S. Cl.
CPC ....... *H04W 68/02* (2013.01); *H04W 72/0446* (2013.01); *H04W 76/45* (2018.02); *H04W 84/08* (2013.01)

(58) Field of Classification Search
None
See application file for complete search history.

(56) References Cited

U.S. PATENT DOCUMENTS 6,438,375 B1 * 8/2002 Muller .............. H04W 52/0216
340/7.33
6,925,561 B1 8/2005 Hunt et al.
(Continued)

FOREIGN PATENT DOCUMENTS

CN 1476259 A 2/2004
CN 1848979 A 10/2006
(Continued)

OTHER PUBLICATIONS

JP 2003513537 dated Apr. 8, 2003, English description of corresponding document WO 0131968 A1.
(Continued)

*Primary Examiner* — Huy D Vu
*Assistant Examiner* — Bao G Nguyen
(74) *Attorney, Agent, or Firm* — Plumsea Law Group LLC (57) ABSTRACT

The method for sending the trunking paging includes: after receiving a group paging request, a base station sending a paging message to trunking terminals in a present cell in a predetermined paging time slot, wherein the paging message includes a group identification of a group needing to be paged. A base station for sending the trunking paging includes a receiving module and a sending module. A method for receiving the trunking paging includes: after monitoring a paging message, when determining that a group identity included in the paging message is the same as a group identity of the group to which the present terminal belongs, a trunking terminal accessing the group service, and sending a paging response to base station, or not sending a paging response to base station. A trunking terminal for receiving the trunking paging includes a monitoring module, a judging module and a group service processing module.

17 Claims, 6 Drawing Sheets

(51) Int. Cl.
*H04W 84/08* (2009.01)
*H04W 76/45* (2018.01)

(56) References Cited

U.S. PATENT DOCUMENTS

| | | | | |
|---|---|---|---|---|
| 8,630,293 | B2* | 1/2014 | Cohen | F03G 6/067 250/203.4 |
| 2007/0005768 | A1* | 1/2007 | Won | H04L 65/4084 709/225 |
| 2008/0287146 | A1 | 11/2008 | Liu et al. | |
| 2009/0210539 | A1* | 8/2009 | Funabiki | H04L 12/2805 709/228 |
| 2010/0267400 | A1 | 10/2010 | Wu | |
| 2011/0151913 | A1* | 6/2011 | Forster | H04W 4/20 455/509 |
| 2011/0160924 | A1* | 6/2011 | Cohen | F03G 6/067 700/287 |
| 2011/0258312 | A1* | 10/2011 | Herlein | G06F 21/10 709/224 |
| 2012/0076085 | A1* | 3/2012 | Chou | H04W 68/00 370/329 |
| 2013/0156021 | A1* | 6/2013 | Ashikhmin | H04L 25/03343 370/338 |
| 2015/0296481 | A1* | 10/2015 | Yu | H04W 68/02 370/336 |

FOREIGN PATENT DOCUMENTS

| | | |
|---|---|---|
| CN | 101166299 A | 4/2008 |
| CN | 101228728 A | 7/2008 |
| CN | 101582734 A | 11/2009 |
| CN | 101931960 A | 12/2010 |
| CN | 102083013 A | 6/2011 |
| CN | 102098593 A | 6/2011 |
| CN | 102113275 A | 6/2011 |
| CN | 102209389 A | 10/2011 |
| CN | 102215458 A | 10/2011 |
| CN | 102291680 A | 12/2011 |
| EP | 1821557 A1 | 8/2007 |
| EP | 2066135 A1 | 6/2009 |
| EP | 2903312 A | 8/2015 |
| JP | 2003513537 A | 4/2003 |
| JP | 2003513573 A | 4/2003 |

OTHER PUBLICATIONS

JP 2003513537 dated Apr. 8, 2013, English translation of Abstract of corresponding document WO 0131968 A1.
European Search Report dated Dec. 8, 2015 in European Patent Application No. 13852087.9.
Japanese Office Action dated Mar. 16, 2016 in Japanese Patent Application No. 2015-540022.
JP 2003513573 A dated Apr. 8, 2013, Machine Translation into English.
CN 102215458 dated Oct. 12, 2011, Machine Translation into English.
Office Action dated Mar. 9, 2018 for Chinese Application No. 201210427920.2 (and machine translation).

* cited by examiner

METHOD AND CORRESPONDING APPARATUS FOR SENDING AND RECEIVING TRUNKING PAGING IN LTE SYSTEM

CROSS-REFERENCE TO RELATED APPLICATION(S)

This application is the U.S. National Phase application of PCT application number PCT/CN2013/08074 having a PCT filing date of Aug. 2, 2013, which claims priority of Chinese patent application 201210427920.2 filed on Oct. 31, 2012, the disclosures of which are hereby incorporated by reference.

TECHNICAL FIELD

The present document relates to the field of mobile communication technology, and more particular, to a method and a corresponding apparatus for sending and receiving trunking paging in the LTE (Long Term Evolution) system.

BACKGROUND OF THE RELATED ART

LTE is the 3GPP Long Term Evolution project and is the largest new technology research and development project started by the 3GPP in the recent two years, and this technology which takes the OFDM (Orthogonal Frequency Division Multiplexing) and the FDMA (Frequency Division Multiple Addressing) as the key can be seen as a "quasi-4G" technology. The main advantages of the LTE are high peak rate, small system time delay, and supporting flexible bandwidth configuration. For example: a 20 MHz spectrum bandwidth can provide a peak rate of 100 Mbps in downlink and 50 Mbps in uplink, a one-way transmission delay within the user plane is less than 5 ms, and the flexible configuration of 1.25 MHz to 20 MHz bandwidth can be supported, moreover, the carrier aggregation technology can be used to further improve the capacity of cell. The LTE has a broad application prospect.

The paging transmission mode of professional trunking system of CDMA (Code Division Multiple Access) 2000 is hashing according to the terminal IMSI (International Mobile Subscriber Identification Number) and selecting a specific time slot to send, and when the number of users monitored in the group is relatively large, the paging amount is relatively large, moreover the IMSI needs to be brought by a PDS (PTT Dispatch Server) to the BSC (Base Station Controller), and the BSC needs to use some overheads to store the IMSI. The CDMA2000-based professional trunking system has been widely used in the past few years, and how to achieve a smooth transition from the trunking system to 4G in the case that the CDMA 2000 network and the LTE network coexist in the future is a subject worthy of study.

SUMMARY OF THE INVENTION

The embodiment of the present invention provides a method and a corresponding apparatus for sending trunking paging in the LTE system to reduce the number of paging messages to be sent.

The embodiment of the present invention provides a method for sending trunking paging in the LTE system, comprising:

after receiving a group paging request, a base station sending a paging message to trunking terminals in a present cell in a predetermined paging time slot, wherein the paging message comprises group identifications of groups needing to be paged.

Preferably, the base station sending a paging message to trunking terminals in the present cell in a predetermined paging time slot comprises:

when determining that the calling in the group paging request belongs to the present cell and resources for the group paging request in the present cell are not established, the base station sending a paging message to the trunking terminals in the present cell within the predetermined paging time slot at the same time when establishing group resources for the group paging request or after establishing group resources for the group paging request; when determining that the calling in the group paging request does not belong to the present cell, the base station sending a paging message to the trunking terminals in the present cell within the predetermined paging time slot.

Preferably, said sending a paging message to the trunking terminals in the present cell within the predetermined paging time slot comprises:

when paging messages of two or more groups in the present cell are to be sent, combining the paging messages of the two or more groups, and sending the combined paging message to the trunking terminals in the present cell in the predetermined paging time slot.

Preferably, after sending the paging message, the method further comprises:

the base station not waiting for a page response, establishing resources for the group paging request when determining that resources for the group paging request in the present cell are not established, and periodically sending the paging message.

Preferably, said periodically sending the paging message comprises: periodically combining and sending paging messages of groups needing to be paged in the present cell, wherein the paging message comprise group identifications of one or more groups needing to be paged.

Preferably, the paging message further comprises paging response identification information corresponding to the groups needing to be paged, wherein the paging response identification information is used for indicating whether a terminal in the corresponding group needs to send a paging response or not.

Preferably, after the base station receives paging responses sent by one or more terminals in the group and sends a paging message to the terminals in the group again, the paging response identification information indicates the terminals in the group that no paging response needs to be sent.

Preferably, the paging message further comprises priority identification information corresponding to a group needing to be paged.

Preferably, trunking terminals within the present cell comprise trunking terminals in an idle state and/or trunking terminals in a LTE service state.

The embodiment of the present invention further provides a base station for sending trunking paging in a LTE system, comprising a receiving module and a sending module, wherein:

the receiving module is configured to: receive a group paging request;

the sending module is configured to: after the receiving module receives the group paging request, send a paging message to trunking terminals in the present cell in a predetermined paging time slot, wherein the paging message comprises group identifications of groups needing to be paged.

The base station further comprises a judging module, which is configured to: after the receiving module receives the group paging request, judge whether the calling in the group paging request belongs to a present base station cell or not;

the sending module is configured to:

when the judging module determines that the calling in the group paging request belongs to the present cell and resources for the group paging request in the present cell are not established, send a paging message to trunking terminals in the present cell within the predetermined paging time slot at the same time when establishing group resources for the group paging request or after establishing group resources for the group paging request; and send a paging message to the trunking terminals in the present cell in the predetermined paging time slot when the judging module determines that the calling in the group paging request does not belong to the present cell.

Preferably, the sending module is configured to:

when paging messages of two or more groups in the present cell are to be sent, combine the paging messages of the two or more groups, and send the combined paging message to trunking terminals in the present cell in a predetermined paging time slot.

Preferably, the base station further comprises a resource establishing module, which is configured to: not wait for a page response after the sending module sends the paging message, establish resources for the group paging request when determining that resources for the group paging request are not established in the present cell, and indicate the sending module to periodically send the paging message.

Preferably, the sending module is configured to periodically send the paging message in the following way: periodically combining and sending the paging messages of the groups needing to be paged within the present cell, wherein the paging message comprises group identifications of one or more groups needing to be paged.

Preferably, the paging message further comprises paging response identification information corresponding to the groups needing to be paged, wherein the paging response identification information is used for indicating the terminals in the corresponding group whether a paging response needs to be sent or not.

Preferably, the base station further comprises a paging response identification information setting module, which is configured to, after the base station receives paging responses sent by one or more terminals in the group and when the sending module sends a paging message to the terminals in the group again, set the paging response identification information to indicate the terminals in the group that no paging response needs to be sent.

Preferably, the paging message further comprises priority identification information corresponding to the groups needing to be paged.

Preferably, trunking terminals in the present cell comprise trunking terminals in an idle state, and/or trunking terminals in a LTE service state.

To solve the abovementioned technical problem, the embodiment of the present invention further provides a method for receiving trunking paging in the LTE system, comprising:

after a trunking terminal monitors a paging message, accessing the group service when determining that a group identification contained in the paging message is the same as a group identification of the group to which the trunking terminal belongs;

the trunking terminal sending a paging response to the base station or not sending a paging response to the base station, or judging whether to send a page response to the base station or not according to paging response identification information contained in the paging message.

Preferably, when the trunking terminal is in the LTE service state, said sending a paging response to the base station comprises: the trunking terminal sending a paging response in a physical uplink shared channel (PUSCH).

Preferably, said judging whether to send a page response to the base station or not according to paging response identification information contained in the paging message comprises:

the trunking terminal sending a paging response to the base station when determining that the paging response identification information indicates that a paging response needs to be sent, and the trunking terminal not sending a page response to the base station when determining that the paging response identification information indicates that no paging response needs to be sent.

Preferably, said sending a paging response to the base station comprises: the trunking terminal immediately sending a page response to the base station, or sending a paging response to the base station after a time delay.

Preferably, the paging message further comprises priority identification information corresponding to the group;

said accessing the group service when determining that a group identification contained in the paging message is the same as the group identification of the group to which the present terminal belongs comprises:

when determining that two or more group identifications contained in the paging message are the same as the group identification of the group to which the present terminal belongs, selecting to access the group service of the group with the highest priority according to the priority identification information corresponding to the group.

Preferably, the paging message further comprises priority identification information corresponding to the group; the trunking terminal is in the group service, said accessing the group service when determining that the group identification contained in the paging message is the same as the group identification of the group to which the present terminal belongs comprises:

the trunking terminal in the group service determining that the group identification contained in the paging message is the same as the group identification of the group to which the present terminal belongs and the priority of the group contained in the paging message is higher than the priority of the current group, exiting from the current group service, and accessing the group service indicated by the group identification contained in the paging message.

To solve the abovementioned technical problem, the embodiment of the present invention further provides a trunking terminal for receiving trunking paging in the LTE system, comprising a monitoring module, a judging module, and a group service processing module, wherein:

the monitoring module is configured to: monitor a paging message;

the judging module is configured to: after the monitoring module monitors a paging message, judge whether a group identification contained in the paging message is the same as the group identification of the group to which the terminal belongs or not;

the group service processing module is configured to: when the judging module determines that the group identification contained in the paging message is the same as the group identification of the group to which the trunking terminal belongs, access the group service, and send a paging response to the base station, or not send a paging response to the base station, or judge whether to send a page response to the base station or not according to the paging response identification information contained in the paging message.

Preferably, the group service processing module is configured to send a page response to the base station in the following way: the group service processing module sending the paging response in a physical uplink shared channel (PUSCH) when determining that the present trunking terminal is in the LTE service state.

Preferably, the group service processing module is configured to judge whether to send a paging response to the base station or not in the following way:

sending a page response to the base station when determining that the paging response identification information indicates that a paging response needs to be sent, and not sending a paging response to the base station when determining that the paging response identification information indicates that no paging response needs to be sent.

Preferably, the group service processing module is configured to send a paging response to the base station in the following way: immediately sending a paging response to the base station, or sending a paging response to the base station after a time delay.

Preferably, the paging message further comprises priority identification information corresponding to the group;

the group service processing module is configured to access a group service in the following way:

when the judging module determines that two or more group identifications contained in the paging message are the same as the group identification of the group to which the present terminal belongs, selecting to access a group service of the group with the highest priority according to the priority identification information corresponding to the group.

Preferably, the paging message further comprises priority identification information corresponding to the group, and when the current trunking terminal is in the group service, the group service processing module is configured to access the group service in the following way:

when the judging module determines that the group identification contained in the paging message is the same as the group identification of the group to which the present terminal belongs and determines that the priority of the group contained in the paging message is higher than the priority of the current group, making the trunking terminal exit the current group service, and accessing the group service indicated by the group identification contained in the paging message.

In the embodiment of the present invention, the trunking function is implemented based on the LTE protocol architecture, and one paging message is used to contain group identifications of all the groups needing to be paged, which can reduce the header overhead of each protocol layer when sending the paging separately, increase the capacity of system and decrease the system implementation complexity. Furthermore, using the paging message to carry the paging response flag can control the terminal to send a paging response, which reduces the occupation of the uplink resources. Moreover, the random processing performed on the time point at which a terminal sends a paging response can reduce uplink conflict. The method and apparatus in the present application can be used to reduce the complexity of the system periodically sending trunking paging, reduce the downlink paging overhead and the uplink paging response overhead, and increase the capacity of system.

PREFERRED EMBODIMENTS OF THE INVENTION

Hereinafter in conjunction with the accompanying drawings, the embodiments of the present invention will be described in detail. It should be noted that in the case of no conflict, embodiments of the present application and features in the embodiments may be arbitrarily combined with each other.

Herein the term "plurality" is equivalent to "two or more", the "two or more" includes two. In this specification, the terminal refers to a trunking terminal unless there are special indications. The base station in this specification is a base station supporting the trunking service. In this specification, the paging message is a trunking paging message.

The First Embodiment

Figure 1:
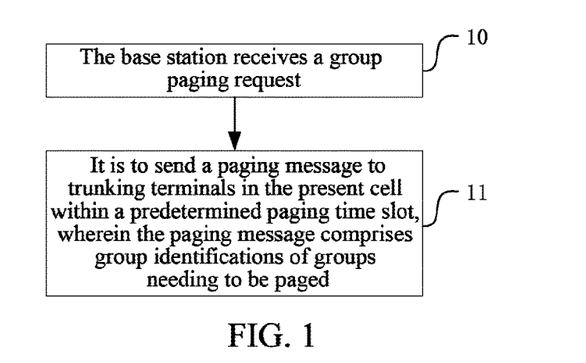
FIG. 1 is a flow chart of a base station sending a paging message in accordance with a first embodiment of the present invention.

The present embodiment describes a method for sending trunking paging in the LTE system, as shown in FIG. 1, it comprises the following steps:

in step 10, the base station receives a group paging request;

in step 11, it is to send a paging message to trunking terminals in the present cell within a predetermined paging time slot, wherein the paging message comprises group identifications of groups needing to be paged.

For a trunking service, paging messages monitored by each terminal within the group are the same, and there is no need to send paging messages individually for each terminal. Therefore, the present embodiment designs to use one paging message to contain group identifications of all the groups needing to be paged, thus reducing the number of paging messages to be sent and reducing the header overhead of each protocol layer when sending the paging separately, increasing the capacity of system and reducing the system implementation complexity.

In one preferred embodiment, the base station performs discriminating processing according to whether the calling belongs to the present cell or not:

When determining that the calling in the group paging request belongs to the present cell and the resources for the group paging request in the present cell are not established, the base station sending a paging message to the trunking terminals in the present cell within the predetermined paging time slot at the same time when establishing group resources for the group paging request or after establishing group resources for the group paging request; for a group paging request in which the calling does not belong to the present cell, establishing group resources in advance can speed up the establishment of group service; when determining that the calling in the group paging request does not belong to the present cell, sending a paging message to the trunking terminals in the present cell within the predetermined paging time slot.

One mode of sending the paging message to the trunking terminals in the present cell comprises:

when paging messages of two or more groups needing to be sent in the present cell, combining the paging messages of the two or more groups needing to be paged in the present cell, and sending the combined paging message to the trunking terminals in the present cell within the predetermined paging time slot.

In order to speed up the establishment of group service, in one preferred embodiment, after sending the paging message, the base station may not wait for a page response, and establishes resources for the group paging request as long as it determines that resources for the group paging request are not established in the present cell, and it periodically sends a paging message. When periodically sending the paging message, the mode of combining the paging messages can be used for sending, in this case the paging message comprises group identifications of one or more groups needing to be paged.

In another preferred embodiment, the paging message is set to comprise paging response identification information (or called as paging response flag) corresponding to groups needing to be paged, to indicate whether the terminals in the corresponding group need to send a paging response or not. At the first time when sending a paging message to the trunking terminals in the group, the paging response identification information does not need to be carried, or the carried paging response identification information indicates that the terminals in the group need to send a paging response; after the base station receives paging responses sent by one or more terminals in the group and when it sends a paging message to the terminals in the group again, the paging response identification information is set to indicate that the terminals in the group do not need to send a paging response. The abovementioned flag can be used to control the terminals in the cell whether to stop sending a paging response or not, so as to reduce the occupancy of the uplink resources.

In another preferred embodiment, the paging message further comprises priority identification information corresponding to the groups needing to be paged, so as to be used by the terminals for judging which group to be accessed when receiving paging messages of a plurality of groups.

The trunking terminals to which the base station sends the paging message within the present cell comprise trunking terminals in the idle state and/or trunking terminals in the LTE service state.

Figure 2:
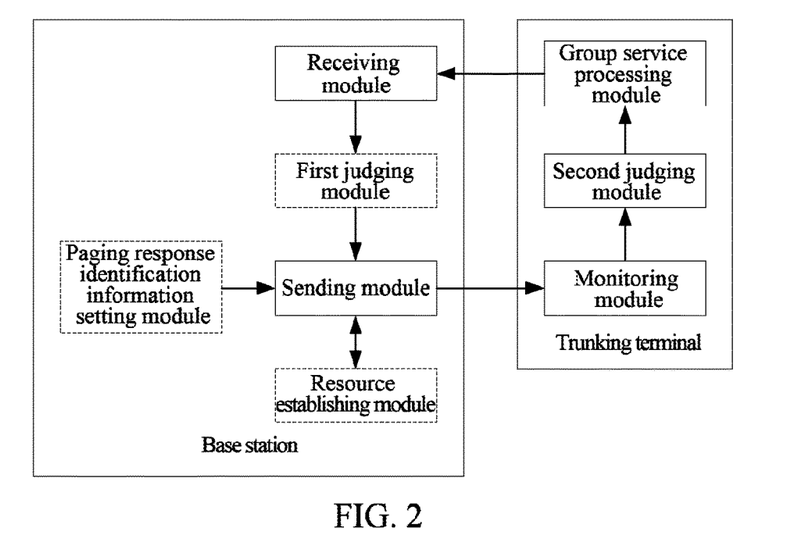
FIG. 2 is a structural diagram of a system in accordance with an embodiment of the present invention.

A base station for implementing the abovementioned method is as shown in FIG. 2, comprising a receiving module and a sending module, wherein:

the receiving module is configured to: receive a group paging request;

the sending module is configured to: after the receiving module receives the group paging request, send a paging message to trunking terminals in the present cell within a predetermined paging time slot, wherein the paging message comprises group identifications of groups needing to be paged.

In one preferred embodiment, the base station further comprises a first judging module, which is configured to: after the receiving module receives the group paging request, judge whether the calling in the group paging request belongs to the present base station cell or not; when the first judging module determines that the calling in the group paging request belongs to the present cell and the sending module determines that resources for the group paging request in the present cell are not established, the sending module sends a paging message to trunking terminals in the present cell within the predetermined paging time slot at the same time when establishing group resources for the group paging request or after establishing group resources for the group paging request; and when the first judging module determines that the calling in the group paging request does not belong to the present cell, the sending module sends a paging message to the trunking terminals in the present cell within the predetermined paging time slot.

When the sending module sends a paging message, the mode of combining the paging messages can be used, for example, when paging messages of two or more groups in the present cell are to be sent, the sending module combines paging messages of the two or more groups needing to be paged in the present cell.

In another preferred embodiment, the abovementioned base station further comprises a resource establishing module, which is configured to: after the sending module sends the paging message, not wait for a page response, and establish resources for the group paging request when determining that resources for the group paging request in the present cell are not established, and indicate the sending module to periodically send the paging message. The sending module can periodically combine and send paging messages of the groups needing to be paged within the present cell when periodically sending the paging message, in the case the paging message comprises group identifications of one or more groups needing to be paged.

In another preferred embodiment, the paging message further comprises paging response identification information corresponding to the groups needing to be paged, to indicate whether the terminals in the corresponding group need to send a paging response or not. The base station may comprise a paging response identification information setting module, and it is configured to: after the base station receives paging responses sent by one or more terminals in the group and the sending module sends a paging message to the terminals in the group again, set the paging response identification information to indicate that the terminals in the group do not need to send a paging response.

The Second Embodiment

Figure 3:
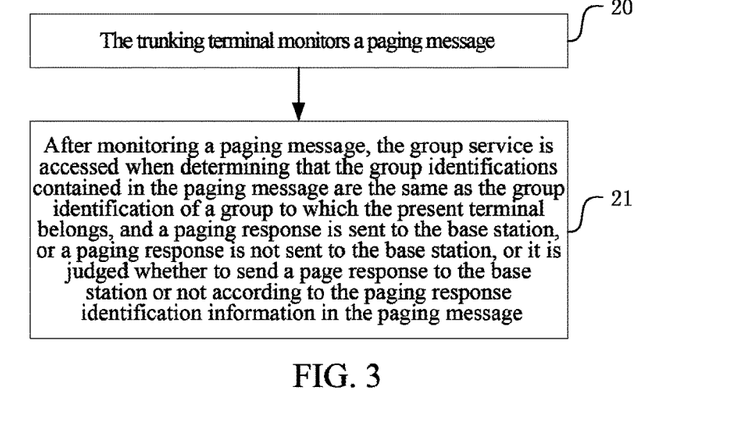
FIG. 3 is a flow chart of a terminal receiving a paging message in accordance with a second embodiment of the present invention.

The present embodiment describes a method for sending trunking paging in the LTE system, as shown in FIG. 3, it comprises the following steps:

in step 20, the trunking terminal monitors a paging message;

in step 21, after monitoring a paging message, it is to access the group service when determining that the group identifications contained in the paging message are the same as the group identification of a group to which the present trunking terminal belongs, and send a paging response to the base station, or not send a paging response to the base station, or judge whether to send a page response to the base station or not according to the paging response identification information contained in the paging message.

By differently processing the mode of the terminal sending the paging response, it can adapt to different needs of system.

When determining that the group identifications contained in the paging message are different from the group identification to which the present terminal belongs, then the group service is not accessed, and a paging response is not sent to the base station.

When a trunking terminal is in the LTE service state and needs to send a paging response to the base station, a paging response is sent through the physical uplink shared channel (PUSCH).

The abovementioned paging response identification information is used to indicate whether the terminals in the corresponding group need to send a paging response or not, when the paging response identification information indicates that it is required to send a paging response, the trunking terminal sends a paging response to the base station, and when the paging response identification information indicates that there is no need to send a paging response, the trunking terminal does not send a page response to the base station.

For the trunking terminal sending a paging response to the base station, after receiving a paging message, the trunking terminal immediately sends a page response to the base station or sends a paging response to the base station after delaying for a time period (the time period can be decided randomly). After the delay of the terminal sending the paging response is decided at random, the occurrence of uplink conflict can be reduced.

In one preferred embodiment, the paging message further comprises priority identification information corresponding to the group; when two or more group identifications contained in the paging message are the same as the group identification of the group to which the present terminal belongs, the terminal selects to access the group service of the group with the highest priority according to the priority identification information corresponding to the group.

When the trunking terminal is currently in the group service, and the group identifications contained in the paging message are the same as the group identification of the group to which the present terminal belongs, the trunking terminal decides whether to exit the current group service or not according to the priority, and when the priority of the group in the paging message is higher than the priority of the current group, it exits the current group service and accesses the group service indicated by the group identification in the paging message, otherwise maintaining the current condition.

The trunking terminal for implementing the abovementioned method is shown in FIG. 2, comprising a monitoring module, a second judging module, and a group service processing module, wherein:

the monitoring module is configured to: monitor a paging message;

the second judging module is configured to: after the monitoring module monitors a paging message, judge whether the group identifications contained in the paging message are the same as the group identification of the group to which the present terminal belongs or not;

the group service processing module is configured to: when the second judging module determines that the group identifications contained in the paging message are the same as the group identification of the group to which the present terminal belongs, access the group service, and send a paging response to the base station, or not send a paging response to the base station, or judge whether to send a page response to the base station or not according to the paging response identification information in the paging message.

When determining that the present trunking terminal is in the LTE service state, the group service processing module sends the paging response in the PUSCH.

The abovementioned group service processing module judges whether to send a paging response to the base station or not according to the paging response identification information of the paging message, comprising: the group service processing module sending a page response to the base station when determining that the paging response identification information indicates that a paging response needs to be sent, and not sending a paging response to the base station when determining that the paging response identification information indicates that no paging response needs to be sent.

The mode of the group service processing module sending a paging response to the base station can be immediately sending a paging response to the base station, or sending a paging response to the base station after delaying for a time period when the second judging module determines that the group identifications contained in the paging message are the same as the group identification of the group to which the present terminal belongs.

In one preferred embodiment, the paging message further comprises priority identification information corresponding to the group; the group service processing module selects to access the group service of the group with the highest priority according to the priority identification information corresponding to the group and carried in the paging message, when the second judging module determines that two or more group identifications contained in the paging message are the same as the group identification of the group to which the present terminal belongs.

When the current trunking terminal is in a group service, the group service processing module judges whether the priority of the group contained in the paging message is higher than the priority of the current group or not when the second judging module determines that the group identifications contained in the paging message are the same as the group identification of the group to which the present terminal belongs, and if yes, the present trunking terminal exits the current group service, and accesses the group service indicated by the group identification of the paging message; if no, doing nothing.

In the following, application examples are used to describe the abovementioned embodiments in detail and in the case of no conflict, respective application examples and features in the examples may be arbitrarily combined with each other.

Application Example 1

Figure 4:
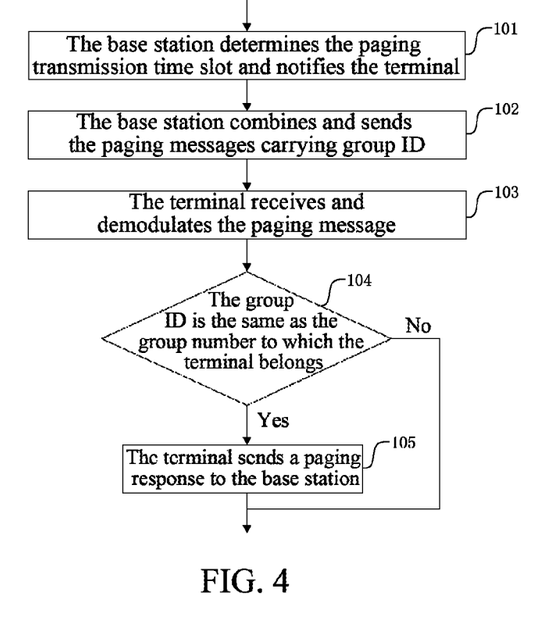
FIG. 4 is a flow chart of an implementation of a trunking terminal immediately sending a paging response after receiving a group call in accordance with a first application example.

As shown in FIG. 4, in this example, the calling and called are not in the same cell, and the called trunking terminal is in the idle state, and a paging message sent by a base station supporting the trunking service to the called trunking terminal comprises group identifications, and the called trunking terminal immediately sends a paging response, comprising the following steps:

in step 101, the base station determines the trunking paging time slot and notifies the trunking terminal (such as notifying the terminal in the SIB, but not limited to SIB);

the trunking paging time slot is used by the trunking terminal for monitoring trunking paging.

In step 102, when establishing a group call, the base station combines the paging messages needing to be sent to respective groups in the present cell, and sends the combined message to the trunking terminals in the present cell in the determined trunking paging time slot, and the paging message carries group identifications (GroupIDs, also known as group numbers) of the groups needing to be paged;

Preferably, the paging message may further carry other group information, such as T-RNTI (Trunking-Radio Network Temporary Identity), and so on.

In step 103, the terminal receives and demodulates the paging message in the time slot which the base station notifies;

In step 104, the terminal immediately sends a paging response to the base station when determining that the group number carried in the paging message is the same as the group number to which the present terminal belongs, and it does not send a paging response when determining that the group number carried in the paging message is not the same as the group number to which the present terminal belongs;

in step 105, after receiving the paging response message, the base station establishes resources for the group when determining that group resources for the group to which the trunking terminal sending the paging response belongs in the cell are not established, and it periodically sends the paging message.

When periodically sending the paging message, if there are paging messages of a plurality of groups, the messages may be combined and sent.

Application Example 2

Figure 5:
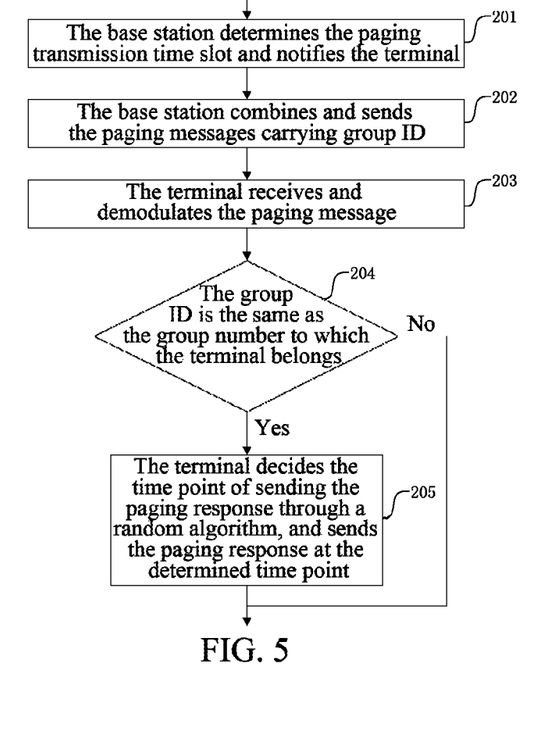
FIG. 5 is a flow chart of an implementation of a trunking terminal delaying to send a paging response after receiving a group call in accordance with a second application example.

As shown in FIG. 5, in this example, the calling and called are not in the same cell, and the called trunking terminal is in the idle state, and the paging message sent by a base station supporting the trunking service to the called trunking terminal contains group identifications, and the called trunking terminal delays to send a paging response, comprising the following steps:

in step 201, the base station determines the trunking paging time slot and notifies the trunking terminal (such as notifying the terminal in a SIB, but not limited to SIB);

in step 202, when establishing a group call, the base station combines the paging messages needing to be sent to respective groups in the present cell, and sends the combined message to the trunking terminals in the present cell in the determined trunkings paging time slot, and the paging message carries group identifications of the groups needing to be paged (it may also comprise other group information);

in step 203, the terminal receives and demodulates the paging message in the time slot which the base station notifies;

in step 204, the terminal determines that the group number carried in the paging message is the same as the group number to which the present terminal belongs, uses a random delay algorithm to determine the time point at which sending a page response to the base station, and it sends a paging response at the calculated time point of paging response, and it does not send a paging response if the paging message does not have a group number matching with the group number to which the present terminal belongs;

in step 205, after receiving the paging response message, the base station establishes resources for the group when determining that group resources for the group to which the trunking terminal sending the paging response belongs in the cell are not established, and it periodically sends the paging message.

Application Example 3

Figure 6:
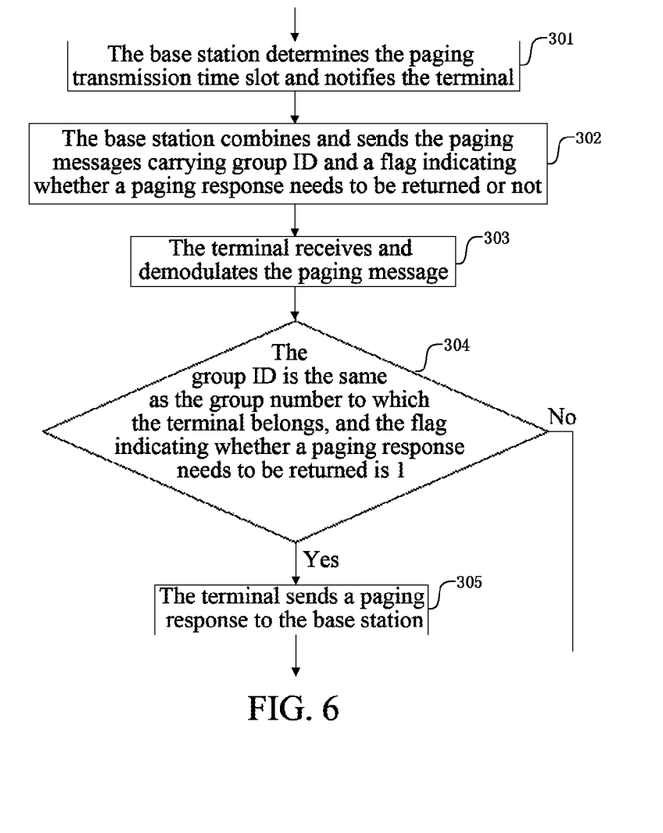
FIG. 6 is a flow chart of an implementation of adding a flag in the trunking paging message and the terminal immediately sending a paging response in accordance with a third application example.

As shown in FIG. 6, in this example, the calling and called are not in the same cell, and the called trunking terminal is in the idle state, and the paging message sent by a base station supporting the trunking service to the called trunking terminal contains group identifications and the field of paging response identification (bNeedPagingResponse), and the called trunking terminal immediately sends a paging response, comprising the following steps:

in step 301, the base station determines the trunking paging time slot and notifies the trunking terminal (such as notifying the terminal in a SIB, but not limited to SIB);

in step 302, when establishing a group call, the base station combines the paging messages needing to be sent to respective groups in the present cell, and sends the combined message to the trunking terminals in the present cell in the determined trunking paging time slot, and the paging message carries group identifications of the groups needing to be paged (it may also comprise other group information) as well as a flag bNeedPagingResponse indicating whether it needs to return a paging response or not, and the initial value of the bNeedPagingResponse is 1;

in step 303, the terminal receives and demodulates the paging message in the time slot which the base station notifies;

in step 304, the terminal immediately sends a paging response to the base station when determining that the group number carried in the paging message is the same as the group number to which the present terminal belongs and bNeedPagingResponse=1, otherwise, it does not send a paging response;

in step 305, after receiving the paging response message, the base station establishes resources for the group when determining that group resources for the group to which the trunking terminal sending the paging response belongs in the cell are not established, and it sets the bNeedPagingResponse of the paging message of the group to 0 and periodically sends the paging message.

The flag of bNeedPagingResponse corresponds to the group, i.e., one group corresponds to one ID, as long as one terminal in the group feeds back a paging response, the base station sets the paging response identification of the group to 0.

Application Example 4

Figure 7:
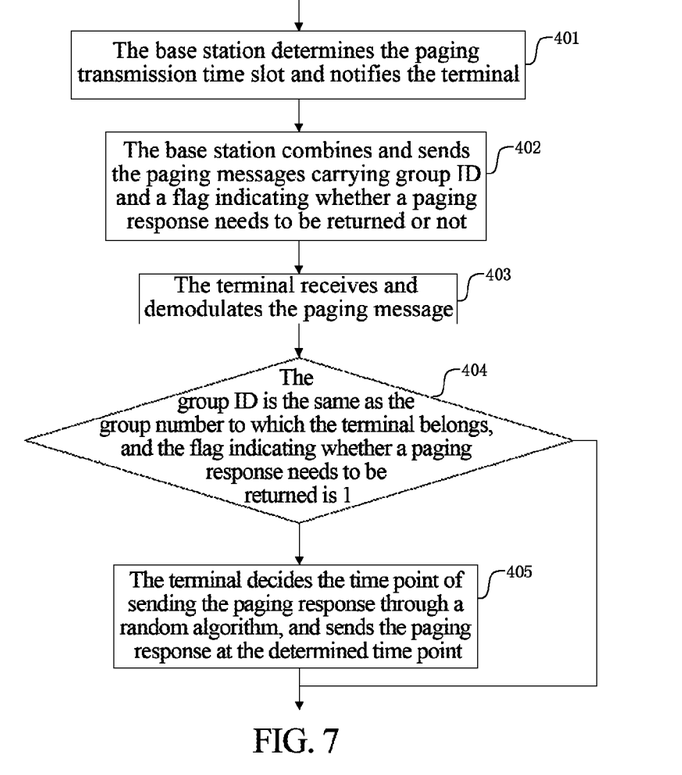
FIG. 7 is a flow chart of an implementation of adding a flag in the trunking paging message and the terminal delaying to send a paging response in accordance with a fourth application example.

As shown in FIG. 7, in this example, the calling and called are not in the same cell, and the called trunking terminal is in the idle state, the paging message sent by a base station supporting the trunking service to the called trunking terminal comprises group identifications and the field of paging response identification (bNeedPagingResponse), and the called trunking terminal delays to send a paging response, comprising the following steps:

in step 401, the base station determines the trunking paging time slot and notifies the trunking terminal (such as notifying the terminal in a SIB, but not limited to the SIB);

in step 402, when establishing a group call, the base station combines the paging messages needing to be sent to respective groups in the present cell, and sends the combined message to the trunking terminals in the present cell in the determined trunking paging time slot, and the paging message carries group identifications of the groups needing to be paged (it may also comprise other group information) as well as the flag bNeedPagingResponse indicating whether it needs to return a paging response or not, and the initial value of the bNeedPagingResponse is 1;

in step 403, the terminal receives and demodulates the paging message in the time slot which the base station notifies;

in step 404, the terminal determines the time point of sending the paging response to the base station through a random algorithm when determining that the group numbers carried in the paging message are the same as the group number to which the present terminal belongs and bNeedPagingResponse=1 and sends a paging response at the calculated time point of paging response, and it does not send the paging response if the paging message does not carry the group number to which the present terminal belongs or bNeedPagingResponse=0;

in step 405, after receiving the paging response message, the base station establishes resources for the group when determining that group resources for the group to which the trunking terminal sending the paging response belongs in the cell are not established, and it sets the bNeedPagingResponse of the paging message of the group to 0 and periodically sends the paging message.

Application Example 5

Figure 8:
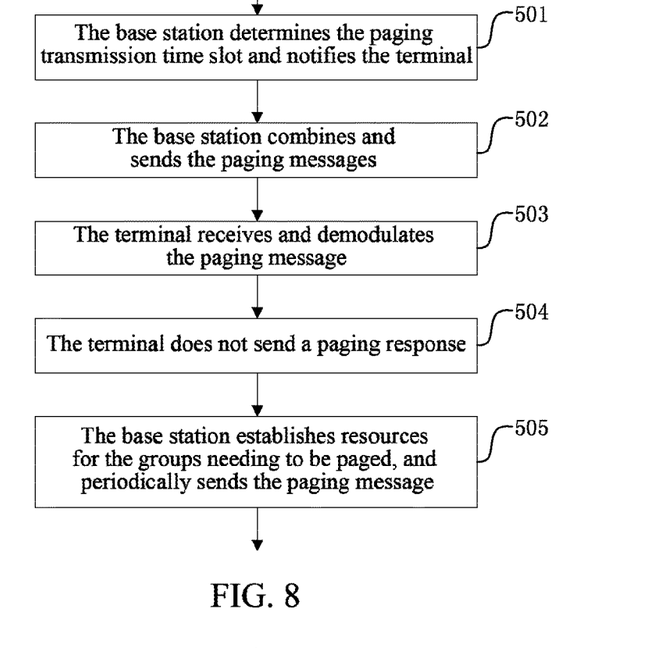
FIG. 8 is a flow chart of an implementation of a trunkings terminal not returning a paging response in accordance with a fifth application example.

As shown in FIG. 8, in this example, the calling and called are not in the same cell, and the called trunking terminal is in the idle state, the paging message sent by a base station supporting the trunking service to the called trunking terminal comprises group identifications, and the trunking terminal does not send a paging response after receiving the paging message, comprising the following steps:

in step 501, the base station determines the trunking paging time slot and notifies the trunking terminal (such as notifying the terminal in a SIB, but not limited to the SIB);

in step 502, when establishing a group call, the base station combines the paging messages needing to be sent to respective groups in the present cell, and sends the combined message to the trunking terminals in the present cell in the determined trunkings paging time slot, and the paging message carries group identifications of the groups needing to be paged (it may also comprise other group information);

in step 503, the terminal receives and demodulates the paging message in the time slot which the base station notifies;

in step 504, the terminal does not send a paging response when determining that the group number carried in the paging message is the same as the group number to which the present terminal belongs;

in step 505, the base station does not wait for the paging response message, and directly establishes resources for the paged groups, and periodically sends the paging message.

A terminal, which determines that the group number carried in the paging message is the same as the group number to which the present terminal belongs, accesses the group call, and a terminal, which determines that the group number carried in the paging message is not the same as the group number to which the present terminal belongs, does not access the group call.

In other examples, it can also set the base station to establish group resources without waiting for a paging response.

Application Example 6

Figure 9:
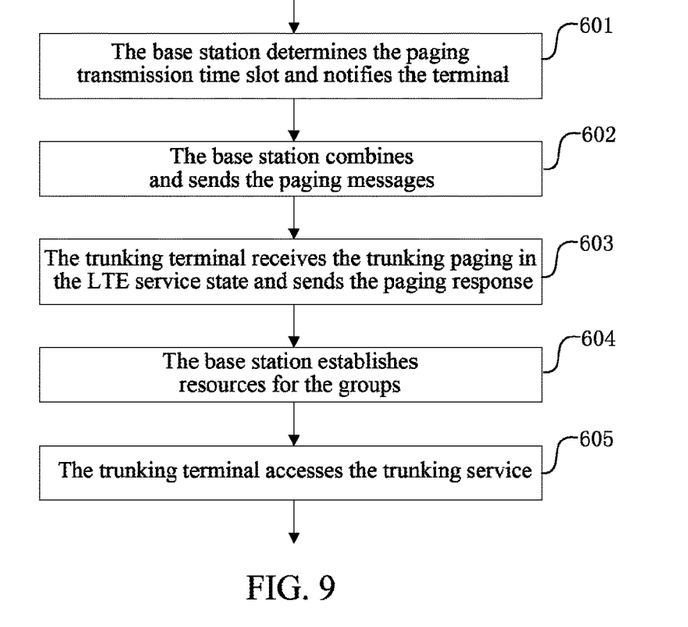
FIG. 9 is a flow chart of an implementation of the trunking terminal receiving trunking paging in the LTE service state in accordance with a sixth application example.

As shown in FIG. 9, the present example describes the processing after receiving a paging message in the case that the calling and called are not in the same cell and the called trunking terminal is in the LTE service state, comprising the following steps:

in step 601, the base station determines the trunking paging time slot and notifies the trunking terminal (such as notifying the terminal in a SIB, but not limited to the SIB);

in step 602, the base station combines the paging messages needing to be sent to respective groups in the present cell, and sends the combined message to the trunking terminals in the present cell in the determined trunking paging time slot, and the paging message carries group identifications of the group needing to be paged (it may also comprise other group information);

in step 603, the trunking terminal receives a trunking paging message in the LTE service state, and sends a paging response to the base station in the PUSCH (Physical Uplink Shared Channel);

in step 604, after receiving the paging response message, the base station establishes resources for the group when determining that the group resources of the trunking terminal sending the paging response in the cell are not established, and it periodically sends the paging message;

in step 605, the trunking terminal accesses the trunking service.

In this example, the trunking terminal may send a paging response to the base station immediately or send the paging response after a certain time delay. In other examples, as described in Application Example 3 or 4, the base station may also carry a paging response flag in the paging message, and the trunking terminal judges whether to send a paging response or not according to the flag, and if the response needs to be sent, the terminal may send it immediately or after a certain time delay.

Application Example 7

Figure 10:
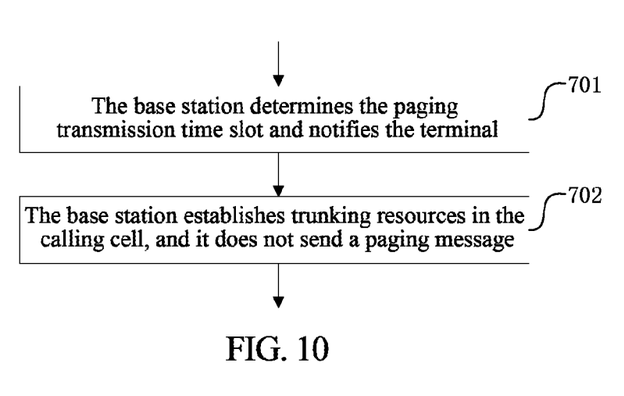
FIG. 10 is a flow chart of an implementation of a base station not sending paging in a calling cell in accordance with a seventh application example.

As shown in FIG. 10, the present example describes the processing of the base station in the case that the calling and called belong to the same cell, comprising the following steps:

in step 701, the base station determines the trunking paging time slot and notifies the trunking terminal (such as notifying the terminal in a SIB, but not limited to the SIB);

in step 702, when establishing a group call, the base station determines that the calling belongs to the present cell, that is, the called and calling belong to the same cell, then there are trunking users in the cell by default, and it directly establishes group resources, that is, the group resources can be established before sending the paging message or at the same time when sending the paging message, in short, it does not have to send a paging message first and then establish the group resources.

The processing after the called trunking terminal receives a paging message can refer to the implementation in the abovementioned application examples.

Application Example 8

The present example describes the scenario in which the paging message sent by the base station carries the priority, i.e., the paging message sent by the base station carries the priority identification information corresponding to the groups needing to be paged. This example can be combined with any of the abovementioned examples.

When a certain terminal belongs to a plurality of groups and the plurality of groups just have services at the same time, there will be the case that: a plurality of group IDs contained in the paging message are the same as the group ID to which the present terminal belongs when the terminal judges the paging message, and the terminal selects to access a group service of the group with the highest priority according to the priority identification information of the group.

In another case, when the terminal is currently in a group service, after monitoring a paging message, when determining that the group ID contained in the paging message is the same as the group identification to which the present terminal belongs and the priority of the group in the paging message is higher than the priority of the current group, then the terminal can exit the current group service and access the group service indicated by the group ID in the paging message, and when determining that the group ID contained in the paging message is not the same as the group ID to which the present terminal belongs, or the priority of the group in the paging message is not higher than the priority of the current group, the terminal may not respond to the paging message.

Those ordinarily skilled in the art can understand that all or some of steps of the abovementioned method may be completed by the programs instructing the relevant hardware, and the abovementioned programs may be stored in a computer-readable storage medium, such as read only memory, magnetic or optical disk. Alternatively, all or some of the steps of the abovementioned embodiments may also be implemented by using one or more integrated circuits. Accordingly, each module/unit in the abovementioned embodiments may be realized in a form of hardware, or in a form of software function modules. The patent document is not limited to any specific form of hardware and software combinations.

Of course, the patent document may also have a variety of other embodiments, and without departing from the spirit and essence of the patent document, one skilled in the art may make appropriate changes and modifications in accordance with the patent document, and these appropriate changes and modifications should belong to the protection scope of the appended claims of the present document.

INDUSTRIAL APPLICABILITY

The present embodiment reduces the complexity of the system periodically sending the trunking paging, reduces uplink paging responses and downlink paging overheads, and increases the capacity of system. By combining the trunking paging of different groups in the same cell to be sent in a predetermined time slot and using the paging response flag in the paging message to control the terminals not to send the paging responses again after receiving a paging response from a trunking terminal, the overhead caused by the paging is reduced, and the capacity of system is increased. Moreover, the random delay processing is performed on the time point at which a terminal sends a paging response, which can reduce uplink conflict.

What is claimed is:

1. A method for sending trunking paging in a long term evolution (LTE) system, comprising:
   after receiving a group paging request, a base station sending a paging message to trunking terminals in a present cell in a predetermined paging time slot, wherein the paging message comprises group identifications of groups needing to be paged, and
   the paging message further comprises a paging response flag corresponding to the groups needing to be paged, wherein the paging response flag is used for indicating whether a terminal in a corresponding group needs to send a paging response or not, wherein if a value of the paging response flag is 1, the paging response will be sent, and if the value of the paging response flag is 0, the paging response will not be sent, and if one terminal in a group feeds back the paging response, the base station sets the paging response flag corresponding to the group to 0 when sending a paging message to the terminals in the group again.

2. The method of claim 1, wherein:
   the base station sending a paging message to trunking terminals in a present cell in a predetermined paging time slot comprises:
   when determining that calling in the group paging request belongs to the present cell and resources for the group paging request in the present cell are not established, the base station sending the paging message to the trunking terminals in the present cell in the predetermined paging time slot at the same time when establishing group resources for the group paging requestor after establishing group resources for the group paging request; when determining that the calling in the group paging request does not belong to the present cell, the base station sending the paging message to the trunking terminals in the present cell in the predetermined paging time slot;
   or
   said sending the paging message to the trunking terminals in the present cell in the predetermined paging time slot comprises:
   when paging messages of two or more groups in the present cell are to be sent, combining the paging messages of the two or more groups, and sending the combined paging message to the trunking terminals in the present cell in the predetermined paging time slot.

3. The method of claim 1, wherein:
   after sending the paging message, the method further comprises:

the base station not waiting for a page response, establishing resources for the group paging request when determining that resources for the group paging request in the present cell are not established, and periodically sending the paging message, wherein periodically sending the paging message comprises: periodically combining and sending paging messages of groups needing to be paged in the present cell, wherein the paging messages comprise group identifications of one or more groups needing to be paged.

4. The method of claim 1, wherein:
the paging message further comprises priority identification information corresponding to groups needing to be paged.

5. The method of claim 1, wherein:
the trunking terminals in the present cell comprise trunking terminals in an idle state and/or trunking terminals in a LTE service state.

6. A method for receiving trunking paging in a long term evolution (LTE) system, comprising:
after a trunking terminal monitors a paging message, accessing a group service when determining that a group identification contained in the paging message is the same as a group identification of a group to which the trunking terminal belongs;
the trunking terminal sending a paging response to a base station, or not sending a paging response to the base station, or judging whether to send a page response to the base station or not according to a paging response flag contained in the paging message, wherein, if a value of the paging response flag is 1, the paging response will be sent, and if the value of the paging response flag is 0, the paging response will not be sent, wherein the trunking terminal sending a paging response to the base station comprises: the trunking terminal using a random delay algorithm to determine a time point at which the page response is sent to the base station, and sending the paging response to the base station at the determined time point; and
the trunking terminal receiving a second paging message in which the value of the paging response flag is 0 based on a prior response from a trunking terminal in the group.

7. The method of claim 6, wherein:
when the trunking terminal is in a LTE service state, said sending a paging response to the base station comprises: the trunking terminal sending the paging response in a physical uplink shared channel (PUSCH).

8. The method of claim 6, wherein:
said judging whether to send a page response to the base station or not according to the paging response flag contained in the paging message comprises:
when determining that the paging response flag indicates that a paging response needs to be sent, the trunking terminal sending the paging response to the base station, when determining that the paging response flag indicates that no paging response needs to be sent, the trunking terminal not sending the page response to the base station.

9. The method of claim 6, wherein:
the paging message further comprises priority identification information corresponding to a group;
said accessing the group service when determining that the group identification contained in the paging message is the same as the group identification of the group to which the present terminal belongs comprises:

when determining that two or more group identifications contained in the paging message are the same as the group identification of the group to which the present terminal belongs, selecting to access a group service of a group with the highest priority according to the priority identification information corresponding to the group;

or the paging message further comprises priority identification information corresponding to the group; the trunking terminal is in a group service, and said accessing the group service when determining that the group identification contained in the paging message is the same as the group identification of the group to which the present terminal belongs comprises:
the trunking terminal in the group service determining that the group identification contained in the paging message is the same as the group identification of the group to which the present terminal belongs and the priority of a group contained in the paging message is higher than the priority of a current group, exiting from a current group service, and accessing a group service indicated by the group identification contained in the paging message.

10. A base station for sending trunking paging in a long term evolution (LTE) system, comprising a receiving module, a sending module, and a paging response identification information setting module, wherein:
the receiving module is configured to: receive a group paging request;
the sending module is configured to: after the receiving module receives the group paging request, send a paging message to trunking terminals in a present cell in a predetermined paging time slot, wherein the paging message comprises group identifications of groups needing to be paged, and the paging message further comprises a paging response flag corresponding to the groups needing to be paged, wherein the paging response flag is used for indicating to terminals in a corresponding group whether a paging response needs to be sent or not, wherein, if a value of the paging response flag is 1, the paging response will be sent, and if the value of the paging response flag is 0, the paging response will not be sent; and
the paging response identification information setting module is configured to: after the base station receives a paging response sent by one terminal in a group and when the sending module sends a paging message to the terminals in the group again, set the paging response flag corresponding to the group to 0.

11. The base station of claim 10, wherein:
the base station further comprises a judging module, which is configured to: after the receiving module receives the group paging request, judge whether calling in the group paging request belongs to a present base station cell or not;
the sending module is configured to:
when the judging module determines that the calling in the group paging request belongs to the present cell and resources for the group paging request in the present cell are not established, send the paging message to the trunking terminals in the present cell in the predetermined paging time slot at the same time when establishing group resources for the group paging request or after establishing group resources for the group paging request; and send the paging message to the trunking terminals in the present cell in the predetermined paging time slot when the judging module determines that the calling in the group paging request does not belong to the present cell;

or the sending module is configured to:

when paging messages of two or more groups in the present cell are to be sent, combine the paging messages of the two or more groups, and send the combined paging message to the trunking terminals in the present cell in the predetermined paging time slot.

12. The base station of claim 10, wherein:

the base station further comprises a resource establishing module, which is configured to: not wait for a page response after the sending module sends the paging message, and establish resources for the group paging request when determining that resources for the group paging request are not established in the present cell, and indicate the sending module to periodically send the paging message, wherein the sending module is configured to periodically send the paging message in the following way: periodically combining and sending paging messages of the groups needing to be paged in the present cell, wherein the paging messages comprise group identifications of one or more groups needing to be paged.

13. The base station of claim 10, wherein:

the paging message further comprises priority identification information corresponding to the groups needing to be paged.

14. The base station of claim 10, wherein:

the trunking terminals in the present cell comprise trunking terminals in an idle state, and/or trunking terminals in a LTE service state.

15. A trunking terminal for receiving trunking paging in a long term evolution (LTE) system, comprising a monitoring module, a judging module, and a group service processing module, wherein:

the monitoring module is configured to: monitor a paging message;

the judging module is configured to: after the monitoring module monitors the paging message, judge whether a group identification contained in the paging message is the same as a group identification of a group to which the terminal belongs;

the group service processing module is configured to: when the judging module determines that the group identification contained in the paging message is the same as the group identification of the group to which the trunking terminal belongs, access a group service, and use a random delay algorithm to determine a time point at which a page response is sent to a base station, and send the paging response to the base station at the determined time point, or not send a paging response to the base station, or judge whether to send a page response to the base station or not according to a paging response flag contained in the paging message, wherein if a value of the paging response flag is 1, the paging response will be sent, and if the value of the paging response flag is 0, the paging response will not be sent;

wherein the trunking terminal is configured to receive a subsequent paging message in which the value of the paging response flag is 0 based on a prior response from a trunking terminal in the group.

16. The trunking terminal of claim 15, wherein:

the group service processing module is configured to send the page response to the base station in a following way: the group service processing module sending the paging response in a physical uplink shared channel (PUSCH) when determining that the present trunking terminal is in a LTE service state;

or the group service processing module is configured to judge whether to send the paging response to the base station or not in a following way:

sending the page response to the base station when determining that the paging response flag indicates that the paging response needs to be sent, and not sending the paging response to the base station when determining that the paging response flag indicates that no paging response needs to be sent;

or the paging message further comprises priority identification information corresponding to the group;

the group service processing module is configured to access the group service in a following way:

when the judging module determines that two or more group identifications contained in the paging message are the same as the group identification of the group to which the present terminal belongs, selecting to access a group service of a group with the highest priority according to the priority identification information corresponding to the group.

17. The trunking terminal of claim 15, wherein:

the paging message further comprises priority identification information corresponding to the group, and when a current trunking terminal is in the group service, the group service processing module is configured to access the group service in a following way:

when the judging module determines that the group identification contained in the paging message is the same as the group identification of the group to which the present terminal belongs and determines that the priority of a group contained in the paging message is higher than the priority of a current group, making the trunking terminal exit a current group service, and accessing a group service indicated by the group identification contained in the paging message.

* * * * *